(12) United States Patent
Despain et al.

(10) Patent No.: US 8,756,431 B1
(45) Date of Patent: Jun. 17, 2014

(54) REMOTE ACCESS PRIVILEGES RENEWAL

(75) Inventors: Jay Despain, Salem, OR (US); James Petrizzi, Wilsonville, OR (US); Gregory L. Burge, Salem, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 797 days.

(21) Appl. No.: 10/986,560

(22) Filed: Nov. 11, 2004

Related U.S. Application Data

(60) Provisional application No. 60/519,477, filed on Nov. 12, 2003.

(51) Int. Cl.
*G06F 21/34* (2013.01)

(52) U.S. Cl.
USPC ........... 713/182; 713/155; 713/176; 713/183; 713/185; 726/2

(58) Field of Classification Search
USPC ......................................................... 713/182
See application file for complete search history.

(56) References Cited

U.S. PATENT DOCUMENTS

| | | | | |
|---|---|---|---|---|
| 4,609,780 A | | 9/1986 | Clark | |
| 4,837,822 A | * | 6/1989 | Crosley et al. | 713/185 |
| 4,838,052 A | * | 6/1989 | Williams et al. | 70/63 |
| 4,851,652 A | | 7/1989 | Imran | |
| 4,864,115 A | * | 9/1989 | Imran et al. | 235/492 |
| 5,046,084 A | * | 9/1991 | Barrett et al. | 379/102.06 |
| 5,091,939 A | * | 2/1992 | Cole et al. | 713/183 |
| 5,280,518 A | * | 1/1994 | Danler et al. | 379/102.06 |
| 5,475,375 A | | 12/1995 | Barrett et al. | |
| 5,550,529 A | | 8/1996 | Burge | |
| 5,590,198 A | * | 12/1996 | Lee et al. | 705/61 |
| 5,612,683 A | * | 3/1997 | Trempala et al. | 340/5.23 |
| 5,654,696 A | * | 8/1997 | Barrett et al. | 340/5.33 |
| 5,768,379 A | * | 6/1998 | Girault et al. | 713/185 |
| 5,815,557 A | * | 9/1998 | Larson | 340/5.64 |
| 6,072,402 A | * | 6/2000 | Kniffin et al. | 340/5.28 |
| 6,300,873 B1 | * | 10/2001 | Kucharczyk et al. | 340/568.1 |
| RE38,147 E | * | 6/2003 | Dawson et al. | 713/182 |
| 6,937,140 B1 | * | 8/2005 | Outslay et al. | 340/5.73 |
| 7,009,489 B2 | * | 3/2006 | Fisher | 340/5.7 |
| 7,196,610 B2 | * | 3/2007 | Straumann et al. | 340/5.61 |
| 7,353,396 B2 | * | 4/2008 | Micali et al. | 713/176 |
| 7,412,598 B1 | * | 8/2008 | Gleichauf | 713/155 |
| 7,886,336 B2 | * | 2/2011 | Schuster et al. | 726/2 |
| 2002/0180582 A1 | * | 12/2002 | Nielsen | 340/5.6 |
| 2003/0097572 A1 | * | 5/2003 | Doo et al. | 713/182 |
| 2003/0179075 A1 | * | 9/2003 | Greenman | 340/5.54 |
| 2003/0231102 A1 | * | 12/2003 | Fisher | 340/5.73 |
| 2003/0231103 A1 | * | 12/2003 | Fisher | 340/5.73 |
| 2004/0025039 A1 | * | 2/2004 | Kuenzi et al. | 713/193 |
| 2004/0160304 A1 | * | 8/2004 | Mosgrove et al. | 340/5.21 |

\* cited by examiner

*Primary Examiner* — Kambiz Zand
*Assistant Examiner* — Yonas Bayou
(74) *Attorney, Agent, or Firm* — Cantor Colburn LLP

(57) ABSTRACT

A secure access system includes at least one lock, at least one electronic key with stored information assigned to a user and a system administration for administering user access privileges. A method for remotely updating the user's expired access privileges includes establishing communication between the user and the system administration from a location remote from the system administration, receiving a remote privilege code from the system administration, communicating the remote privilege code to the lock, and, if authorized, the lock validating the privilege code to renew the user's access privileges. The validated privilege code can also be made effective to access other different locks within the system.

18 Claims, 3 Drawing Sheets

Fig. 2
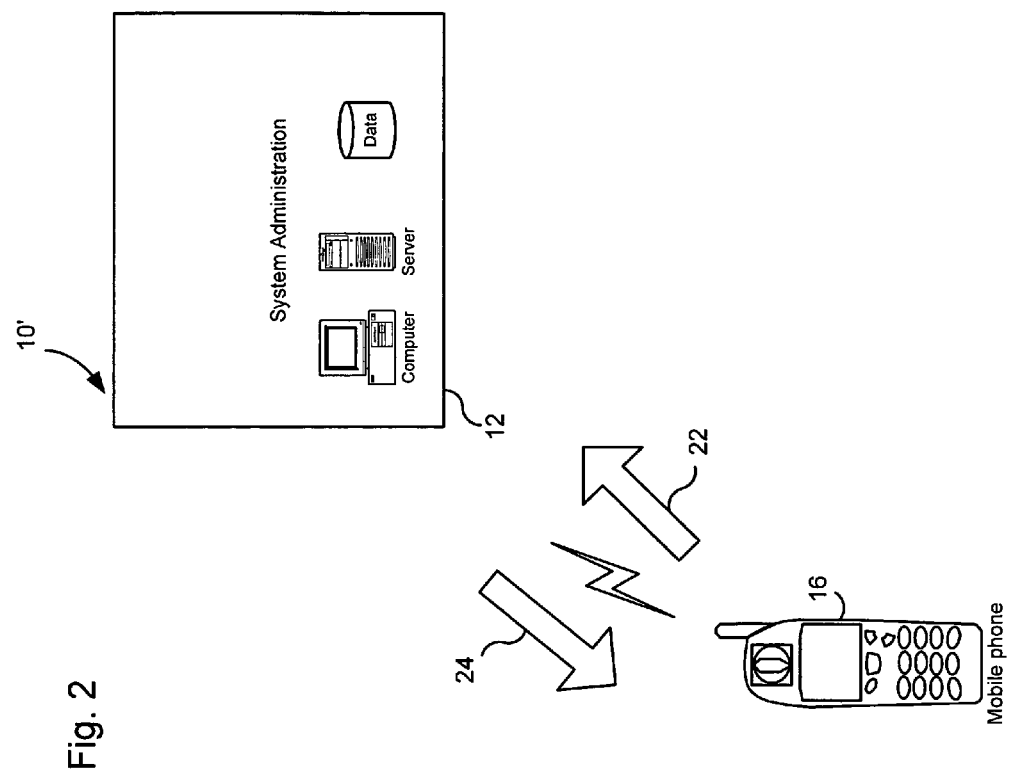
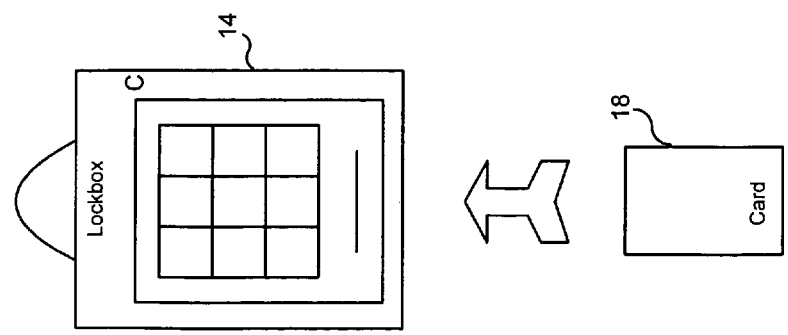

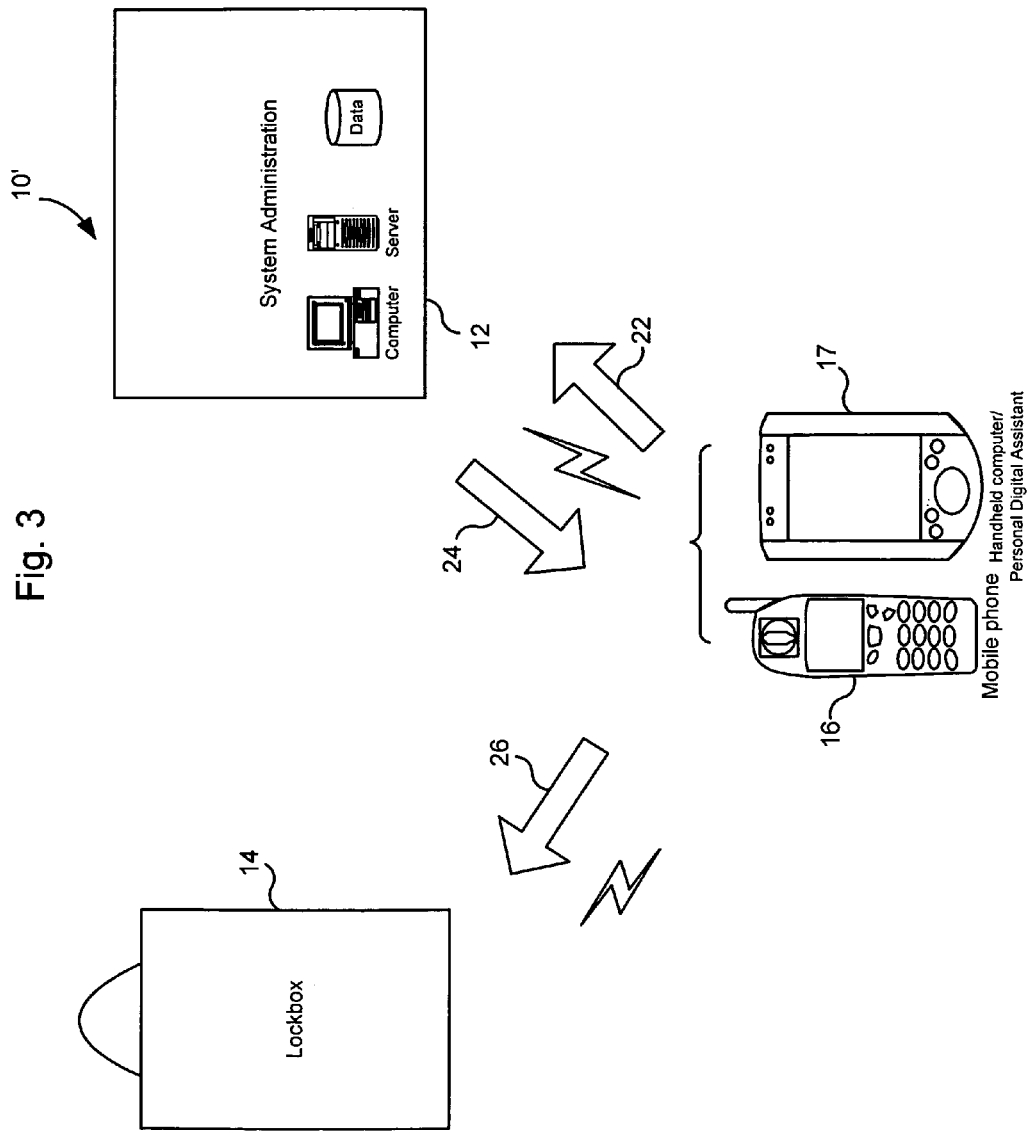

REMOTE ACCESS PRIVILEGES RENEWAL

CROSS REFERENCE TO RELATED APPLICATION

This application claims the benefit of U.S. Provisional Patent Application No. 60/519,477, filed Nov. 12, 2003, which is hereby incorporated by reference.

BACKGROUND

This application relates to controlled access systems, and particularly to innovations in renewing access privileges for a user of the system.

In some controlled access systems, various users are given privileges to access the system on a limited basis. For example, the privileges may be time-limited and set to expire after a given time, such as upon a certain time and/or date, after expiration of a predetermined period following grant of the privileges, etc. Privileges may also be limited in other ways, such as by the occurrence of an event, e.g., exceeding a predetermined number of uses or attempted uses.

Limiting the privileges of users has certain benefits. Limited privileges can improve overall system security because user involvement can be required, e.g., to confirm the user's identity, to confirm the user is an active user, to confirm the user still agrees to comply with the system's rules and policies, etc. The automatic expiration of privileges can reduce the system's exposure to a security breach from a rogue user, because the breach will be limited in time by the next normal expiration of privileges. Limited privileges can allow the system administration to exercise greater control in making changes to the system.

One class of controlled access systems concerns restricting access to physical assets, i.e., access to places or things. If the assets are at different locations, such a system may include centralized administration for efficiency and convenience. In a system with centralized administration, renewal of access privileges generally occurs at a central location or at locations linked to the centralized administration, but not at "in the field" locations, such as near the assets a user might be attempting to access.

The renewal process typically involves some form of check on the user's status to hold access privileges. In some systems, the user may need to verify or authenticate his identity before renewal can take place. If the check reveals that the user is no longer entitled to access privileges, renewal is denied. If the user is in good standing, or addresses the outstanding requirements, renewal takes place and the user is reauthorized for the next privileges period.

One type of controlled access system is used primarily to facilitate the showing of real estate properties to prospective buyers. The system uses electronic lockboxes having a locked compartment that holds a physical key to a dwelling or other site of interest on the property. Access to the lockbox, and thus to the physical key stored in the lockbox, is granted if the user presents an appropriate credential, which can be, e.g., an access code. Such a code can be entered directly on the lockbox, e.g., on a keypad attached to the lockbox, or the user can communicate the code to the lock box. The user can be issued an electronic device, referred to as a "key," that is capable of communicating the access code to the lock box. The access code can be communicated by direct electrical connection (e.g., establishing electrical contact between a portion of the electronic key and corresponding structure associated with the lock box) or any type of wireless communication from the key to the lockbox (e.g., radio, RF, Bluetooth, IR, IrDa, optoelectronic communication, acoustic coupling, etc.).

In conventional systems, the user's key can be a personal digital assistant (e.g., a Palm device, a Pocket PC device, or other device), cellular telephone or other personal general purpose microprocessor-based device capable of being programmed to function as an electronic key. In other conventional systems, the key is a microprocessor-based dedicated electronic key with a user interface (e.g., a keypad) and, optionally, a display. In still other conventional systems, the key is a card having a memory for electronic data, such as a magnetic strip card, an optical memory card, or a smart card with an embedded microchip.

Renewal of access privileges while "out in the field" is not supported in some conventional real estate controlled access systems. Rather, a user seeking to renew his privileges must establish communication with the central administrator from a linked location. Typically, such linked locations would include the user's home or office, and the link could be established via a desktop PC. There may also be a location provided at the real estate board administrator's offices.

In other real estate controlled access systems, access privileges can be renewed remotely, but validation of such remotely renewed privileges is limited. In one scenario, an authorized user requests renewal via a telephone link with a system administration, and receives a code which is then entered via the user's key. Once the code is entered into the key, the key is reauthorized for a predetermined period. Typically, no additional validation takes place. For example, the lock or locks to which the key holder addresses his requests do not separately validate the key holder's identity, etc.

There is a need to make remote renewal of access privileges more feasible, more flexible and more secure in a variety of secure access systems.

SUMMARY

Described herein are methods and apparatus for allowing access privileges to a controlled access system to be renewed at locations remote from the centralized administration of the system.

According to one aspect, the system is a real estate secure access system and includes at least one lock, at least one electronic key with stored information assigned to a user and a system administration for administering user access privileges. A method of remotely updating the user's expired access privileges includes establishing communication between the user and the system administration from a location remote from the system administration, receiving a remote privilege code from the system administration, and communicating the remote privilege code to the lock. If authorized, the lock validates the privilege code to renew the user's expired access privileges.

According to another aspect, a secure entry system includes at least one electronic lock, at least one key operable to unlock the lock and capable of storing information, the stored information including at least identifying information indicating a user to whom the key is assigned and a status of the user's privileges for access to the at least one lock, and a system administration responsive to an update request made by a user from a remote location to update the user's expired system access privileges. The system administration is capable of responding to the request with an automatically generated privilege code that can be presented to the lock. If authorized, the lock validates the privilege code which allows the lock to be opened. In some embodiments, the same validated privilege code, while effective, can open other locks within the system.

According to yet another aspect, a real estate secure access system includes at least one lockbox with a locking storage area and a keypad for entering information, at least one electronic key in the form of a portable solid state memory device with stored information assigned to a user and a system administration that administers privileges to access the system. Remotely updating the user's access privileges with the system includes establishing communication between the user at a remote location and the system administration via a telephone communications link, automatically issuing a remote privilege code from the system administration in response to a request by the user and communicating the remote privilege code to the user via telephone. The telephone communications link can include communication by voice (whether human or automated), message (such as an e-mail, text message, SMS or other type of message), tones, data or other form of communication. The user communicates the received remote privilege code to the lock by entering the remote privilege code on the keypad, with the lock determining that the privilege code is valid and allowing the lock to change from a locked state to an unlocked state to allow the user to access the locking storage area.

If the system is implemented for controlled access to an area, such as a lock securing a building, site, vehicle or other type of secure area, instead of to a lockbox, the user's entry of the valid privilege code unlocks the lock to provide access to the secured area.

BRIEF DESCRIPTION OF DRAWINGS

FIG. 2 is a conceptual drawing similar to FIG. 1 for an alternative embodiment of the system.

FIG. 3 is a conceptual drawing similar to FIG. 1 for another alternative embodiment in which the mobile phone, a PDA or another personal information device is programmed as the electronic key for communicating directly with the lock.

DETAILED DESCRIPTION

Figure 1:
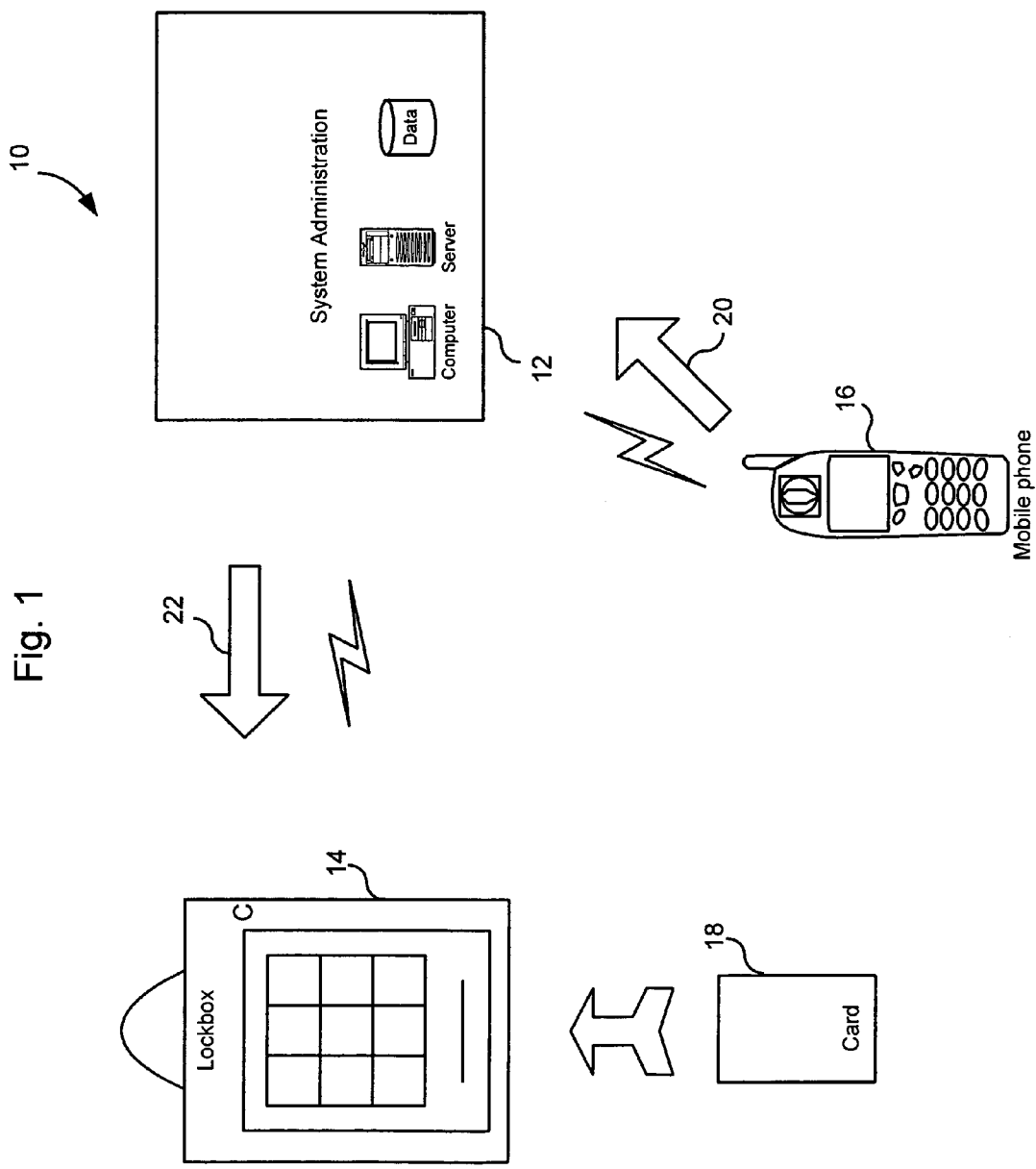
FIG. 1 is a conceptual drawing showing a schematic depiction of a secure entry system for the real estate context with at least one lock (represented by a lockbox), at least one key (represented by the card) assigned to a user seeking access within the system, and a system administration that administers access privileges to the system, including by request from the user at a remote location (represented by the mobile telephone and communications link).

Described herein are new methods and apparatus for use in renewing access privileges to secure access systems.

As used herein, the singular forms "a," "an," and "the" refer to one or more than one, unless the context clearly dictates otherwise.

As used herein, the term "includes" means "comprises."

As used herein, a group of individual members stated in the alternative includes embodiments relating to a single member of the group or combinations of multiple members. For example, the term "a, b, or c," includes embodiments relating to "a," "b," "c," "a and b," "a and c," "b and c," and "a, b, and c."

General

According to a one scenario, a user of a secure access system in the real estate context discovers his access privileges have expired due to his failure to timely renew them. He makes this discovery while working out in the field away his home, office and other locations where conventional renewal could take place. Until now, the user would typically need to interrupt his work out in the field and return to one of the usual locations allowing routine renewal, which is frustrating and lowers productivity.

As described herein, the user can renew his access privileges, if authorized, by completing renewal from a remote location. Remote locations are defined herein to mean locations other than the user's routine renewal locations, such as the user's home, his office or another's office, which typically allow renewal through a wired computer link to the system administrator. Remote locations are typically out in the field and located at some distance from the usual renewal locations. Depending upon the particular implementation, the remote renewal location may be in the general vicinity of one of the locations within the system to which the user is desiring access, or it may be another location which is desirable for renewal because it is more convenient that returning to the routine renewal location.

According to one implementation, the remote locations are at or near the lock boxes currently in service throughout the area served by the system. In the case of the typical user, who is a realtor, he discovers his need to remotely renew his access privileges while he is traveling within the area served by the system. Unless he renews his access privileges, he will be unable to open lockboxes and retrieve the conventional keys stored in the lock boxes. In order to continue showing properties, it would be convenient if he could visit a lock box, and, as at least part of the process, interact with the lock box to renew his privileges. In this way, the realtor could continue his planned work without substantial delay and disruption of his and others' schedules.

The capability for remote renewal can be implemented in each lock box in the system, just a designated few lockboxes, or perhaps even a single lock box (preferably, one that is centrally located).

The user seeking remote renewal may initiate the process by telephoning a designated number set by the system administration. The user can be required to specify a location, e.g., the location of a nearby lockbox which he will interact with as part of the renewal process. The user can specify the location using an identifier, e.g., the lockbox serial number. The user may also be requested to provide a credential demonstrating he is authorized to use the system. This credential may take many forms, including, e.g., a PIN or other similar code.

In response to the user's request, assuming it is accepted, the system grants the user a remote privilege code. The remote privilege codes may be generated automatically by a privilege code engine or according to other known methods.

The remote privilege code can be communicated to the user over the telephone by an operator or by a voice synthesizer service, preferably as part of the same call initiated by the user in making the request.

The remote privilege code may also be communicated in an e-mail or other type of message accessible via the user's mobile phone. With this option, the remote privilege code may be transmitted directly to the user's telephone, or made available on a website accessible to the user via his telephone or a PDA.

Once the user receives the remote privilege code, he can then communicate it to the lockbox. In some implementations, the user communicates the remote privilege code by entering it using a keypad or other user interface of the lockbox. Alternatively, the user may transmit the remote privilege code to the lock box, e.g., via an infrared or other wireless link.

The lockbox validates the remote privilege code. According to some implementations, the validation process includes a challenge/response exchange between the user and the lockbox. For example, the user's entry of the remote privilege code may trigger the lockbox to challenge the user to enter another identifier (e.g., the user's PIN). If the lockbox determines that the user's response to the challenge is not invalid, e.g., the information input by the user does not correspond to invalid users and/or invalid privilege codes, the lockbox grants the user's request. In some implementations, validation can take place at least in part, or redundantly, during the user to system administration communication.

Assuming the remote privilege code indicated by the user is validated, the user's request is granted. In systems where the user must direct his request for remote privilege renewal to the lockbox to which he seeks access, validation of the request allows that lockbox to be unlocked and opened. The user would then repeat the remote privilege renewal process at each lock box of interest until routine renewal of access privileges can be completed.

In other more sophisticated implementations, the initial lockbox can validate the user's request for use at multiple lockboxes. For example, the initial lockbox may return a validated remote privilege code, which may be slightly different from the remote privilege code entered by the user. This validated remote privilege code may be recognizable by other lockboxes within the system to allow the user immediate access. The validated update code may be programmed to expire after a given time period, at a given time or after a given number of uses. In some implementations, this validated update code is stored on the user's key.

In the various processes described above, the user can be required to enter a credential, such as his PIN or another credential, as a check on his authorization to use the system. In this way, physical possession of the key alone does not allow immediate access to the system's functionality. Rather, someone with the key must also have knowledge of a credential to enable to interact with the system.

Key

In some implementations, the key is a smart card or similar type of card providing for magnetic, electronic, optical or other machine-readable storage of information. Such cards are desirable because they are generally small in size, relatively inexpensive to replace in the case of loss or damage and difficult for a casual finder to decipher.

Smart cards are usually, but not necessarily, about the size of a conventional credit card. Such cards are usually updated or programmed by inserting them into a slot of a suitable read/write device. Smart cards can be programmed to operate by being inserted into a similar slot on a device, such as a slot on the lock box, or by being positioned in proximity to the device (as in the case of some security badge and toll booth access cards). A SIM (Subscriber Identity Module) card is a smart card or similar device programmed with the user's identifying information and protected by encryption.

Smart cards are considered to be solid state portable memory devices, i.e., devices without any moving parts. Other portable memory devices, such as flash memory, are also suitable because they can be readily reprogrammed, store sufficient data at a competitive price, are small in size, withstand the physical requirements of daily use, and retain the memory contents without an external source of power. Current flash memory options include PCMIA cards, SmartMedia cards, Memory Stick devices, Compact Flash cards, and others.

In other implementations, the key can be a mobile phone, a personal digital assistant or other personal information device having some general computer functionality, which is also programmed to serve as an electronic key and has a memory.

Lock/Lockbox

The locks of the systems described herein are preferably electronic, i.e., they are actuated to change from a locked state to an unlocked state upon receipt of a predetermined electrical signal or pulse.

A lock box is one particular type of electronic lock having a locking compartment, usually sized for housing the physical keys to a conventional lock (e.g., for a home or other building, fence, vehicle or other type of locked area). Lock boxes are typically secured near the area where the conventional keys would be used. For example, in the real estate context, lock boxes have a shackle allowing the lockbox to be secured to a door knob of a property being shown.

Lockboxes typically have a circuit that includes a controller, a memory, a solenoid to operate the lock mechanism and an interface that receives input from a user. Lockboxes may also include an output interface. The interface may include a key pad or other input device, a display and a transceiver for RF or infrared signals.

If the lockbox is connected with the system administration, such as via a radio frequency link, the lock box also includes components necessary to receive or send and receive signals.

In implementations where the validated privilege code is saved on the key, the lockbox includes components capable of updating the key, such as, in the case where the key is a card, a suitable card writer.

System Administration

The system administration controls user's access rights within the system. The system administration can also disseminate information to users, and depending upon the particular implementation, send or send and receive information from locks within the system.

The system administration typical includes one or more databases which are accessed through a computer or computer network. The database includes information on each user of the system, the user's current status, each lock within the system and its status, as well other information for controlling and overseeing the operation of the secure entry system.

Exemplary Embodiments

FIG. 1 shows a first exemplary embodiment of a secure entry system 10 in which a system administration 12 controls access to electronic locks within the system, such as a lockbox 14. A user of the system 10, represented by a mobile phone 16, communicates with the system administration 12 to request remote renewal of access privileges, as represented by the communications link 20.

The user also has a separate electronic key, which in this embodiment is a smart card 18 or other similar portable solid state memory device. The electronic key is designed to interface with the lockbox 14. In the case of the smart card 18, the lockbox 14 has a slot sized to receive the card and the associated circuitry for reading the smart card 18.

In the system 10, the system administration 12 communicates the privilege code to the lockbox 14 directly as indicated by the communications link 22, such as through wireless communication, e.g., RF communication.

A secure entry system 10' according to a second exemplary embodiment is shown in FIG. 2. In the system 10', the privilege code is communicated to the user via a communications link 24, which can be during the same telephone call initiated by the user or a separate call from the system administration. The user then communicates the privilege code to the lockbox 14, e.g., by entering the privilege code on a keypad.

A secure entry system 10" according to a third exemplary embodiment is shown in FIG. 3. In FIG. 3, the user's mobile telephone 16, his personal digital assistant 17 or other personal information device (not shown) is used to establish communication with the system administration. In the case of a PDA, the communication can be established via a telephone link or a wireless connection, depending upon the particular PDA's capabilities. The privilege code is communicated to the telephone 16 or the PDA 17 via any suitable method, including voice, e-mail or other form of messaging. The user then uses his phone 16 or PDA 17, which is programmed to have the additional functionality of an electronic key in this embodiment, to interface with the lockbox 14, e.g., via a communications link 26, instead of using a separate key such as the card 18.

In any of the systems 10, 10' and 10", the user may be required to provide a credential, e.g., by entering his PIN on a keypad 26 associated with the lockbox 14, as part of the lockbox's validation of the privilege code.

The present invention has been shown in the described embodiments for illustrative purposes only. Further, the terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of remotely updating an expired privilege code of a user of a real estate secure access system, the system comprising at least one lock, at least one electronic key with stored information assigned to the user and a system administration for administering user access privileges, the method comprising:
   establishing communication between the user and the system administrator from a location remote from the system administration;
   receiving a remote privilege code from the system administration; and
   communicating the remote privilege code from the user to the lock,
   wherein the lock is configured to validate the remote privilege code to renew the user's expired privilege code; and provide to the user a validated privilege code for a current access transaction,
   wherein the validated privilege code and expired privilege code are different from of the remote privilege code, and the validated privilege code is effective to access said lock during the current access transaction, and to access other different locks within the system.

2. The method of claim 1, wherein the electronic key is a solid state removable memory device.

3. The method of claim 1, wherein the electronic key is a smart card.

4. The method of claim 1, wherein establishing communication with the system administration includes specifying a lockbox identifier.

5. The method of claim 1, wherein establishing communication between the user and the system administration includes establishing a telephone communications link with the system administration.

6. The method of claim 5, wherein establishing communication with the system administration includes establishing communication with the system administration via a mobile telephone.

7. The method of claim 1, wherein the lock is configured to validate the privilege code using in part a challenge response exchange between the electronic key and the lock.

8. The method of claim 1, wherein the lock is configured to validate the privilege code communicated to the lock based at least in part on the user's communication of a PIN code to the lock and the lock's determination of whether the PIN code is recognized and wherein the lock is configured to change from a locked state to an unlocked state as a result of determining the PIN code is recognized.

9. The method of claim 1, further comprising storing the validated privilege code on the electronic key.

10. The method of claim 1, wherein the validated privilege code expires after a predetermined time period.

11. A method of remotely updating an expired privilege code of a user of a real estate secure access system, the system comprising at least one lock with a locking storage area and a radio receiver, at least one electronic key in the form of a portable solid state memory device with stored information assigned to the user and a system administration that administers privileges to access the system, the method comprising:
    establishing communication between the user at a remote location and the system administration via a wireless communications link;
    automatically issuing a remote privilege code from the system administration in response to a request by the user and communicating the remote privilege code from the system administration to the radio receiver,
    wherein the lock is configured to determine whether the remote privilege code is valid and, as a result of the determination, allow the lock to change from a locked state to an unlocked state to grant the user access to the locking storage area;
    wherein the lock is configured to provide to the user a validated privilege code for a current access transaction,
    wherein the validated privilege code and the expired privilege code are different from the remote privilege code, and
    the validated privilege code is effective to access said lock during the current access transaction, and to access other different locks within the system.

12. The method of claim 11, wherein the request by the user is made by telephone from the remote location.

13. The method of claim 11, wherein the lock generates the validated privilege code based on the remote privilege code.

14. The method of claim 11, wherein the lock is responsive to input from the user at the lock and interfacing of the electronic key with the lock, the lock determining if the user's input is consistent with the remote privilege code.

15. The method of claim 11, wherein the lock is programmed to carryout a challenge response exchange with the user.

16. A lockbox comprising:
    a locking compartment;
    a wireless communication receiver; and a controller configured to receive from a user's electronic key, via the wireless communication receiver, a remote privilege code which causes the controller to generate a modified privilege code to replace an expired privilege code for the user to allow the user to access the locking compartment during a current access transaction, wherein the modified privilege code and the expired privilege code are different from the remote privilege code, and the modified privilege code is configured to renew expired access privileges for the user for another lockbox.

17. A method implemented by a wireless communication device, the method comprising:

wirelessly transmitting from the wireless communication device to an administration center a request to renew a user's expired privilege code;

receiving from the administration center at the wireless communication device a remote privilege code for renewing the user's expired privilege code;

transmitting the remote privilege code from the wireless communication device to a first lockbox; and receiving from the first lockbox at the wireless communication device a validated privilege code for a current access transaction at the first lockbox, wherein the remote privilege code is different from the validated privilege code and the expired privilege code, and wherein the validated privilege code is configured for use by the wireless communication device to renew the user's expired access privileges at a second lockbox.

18. A method of remotely updating expired access privileges of a user of a real estate secure access system, the system comprising at least one lock, at least one electronic key with stored information assigned to the user and a system administration for administering user access privileges, the method comprising:

establishing communication between the user and the system administration from a location remote from the system administration;

receiving from the user at the system administration an identification of a lock with which the user will interact;

receiving from the user at the system administration a credential indicating that the user is authorized to use the system administration;

receiving a remote privilege code from the system administration in response to the credential; and communicating the remote privilege code from the user to the lock, wherein the lock is configured to validate the remote privilege code to renew the user's expired access privileges and provide to the user a validated privilege code for a current access transaction to the lock, wherein the validated privilege code and expired privilege code are different from of the remote privilege code, and the validated privilege code is effective to access the lock during the current access transaction and to access other different locks within the system.

* * * * *